United States Patent
Burstrom et al.

(10) Patent No.: US 9,010,833 B2
(45) Date of Patent: Apr. 21, 2015

(54) WEAR RESISTANT LINING ELEMENT AND METHOD FOR DISENGAGING MATERIAL

(71) Applicant: Metso Minerals (Sweden) AB, Trelleborg (SE)

(72) Inventors: Anders Burstrom, Limhamn (SE); Jonas Hansson, Furulund (SE); Henrik Persson, Trelleborg (SE)

(73) Assignee: Metso Minerals (Sweden) AB, Trelleborg (SE)

( * ) Notice: Subject to any disclaimer, the term of this patent is extended or adjusted under 35 U.S.C. 154(b) by 0 days.

(21) Appl. No.: 14/366,168

(22) PCT Filed: Dec. 17, 2012

(86) PCT No.: PCT/EP2012/075792
§ 371 (c)(1),
(2) Date: Jun. 17, 2014

(87) PCT Pub. No.: WO2013/092489
PCT Pub. Date: Jun. 27, 2013

(65) Prior Publication Data
US 2014/0327265 A1 Nov. 6, 2014

(30) Foreign Application Priority Data
Dec. 23, 2011 (EP) .................................... 11195642

(51) Int. Cl.
*B60R 13/01* (2006.01)
*B60P 1/28* (2006.01)

(52) U.S. Cl.
CPC ........ *B60R 13/01* (2013.01); *B60P 1/286* (2013.01)

(58) Field of Classification Search
CPC .................................. B60R 13/01; B60P 1/286
USPC ..................................... 296/39.1, 39.2, 183, 2
See application file for complete search history.

(56) References Cited

U.S. PATENT DOCUMENTS 4,750,776 A * 6/1988 Barben ................. 296/39.2
5,059,474 A * 10/1991 Yoshida ................ 428/174

(Continued)

FOREIGN PATENT DOCUMENTS

NL      1023277 C2    11/2004
WO    92/08767 A1    5/1992

OTHER PUBLICATIONS

PCT Search Report dated Apr. 23, 2013.

(Continued)

*Primary Examiner* — Dennis H Pedder
(74) *Attorney, Agent, or Firm* — Andrus Intellectual Property Law, LLP

(57) ABSTRACT

The invention relates to a wear-resistant lining element which is intended for a surface on a truck haul body subjected to wear. The wear-resistant lining element has an outwardly directed surface, over which material in the form of pieces or particles, such as crushed ore and crushed rock material, is intended to move, and has an inwardly directed surface intended to face the truck haul body surface. The wear-resistant lining element comprises elastomeric material. The wear-resistant lining element is characterized in that the wear-resistant lining element comprises at least one open cavity in the inwardly directed surface. The invention also relates to a wear-resistant lining, a truck haul body and a method for disengaging material adherent on a truck haul body surface having a wear-resistant lining.

10 Claims, 3 Drawing Sheets

(56) References Cited

U.S. PATENT DOCUMENTS 5,312,162 A 5/1994 Baebel
5,474,831 A * 12/1995 Nystrom ....................... 428/174
2006/0255612 A1 11/2006 Montagna et al.

OTHER PUBLICATIONS

IPRP Chapter II dated Jun. 16, 2014.
Response to Written Opinion dated Jun. 2, 2014.

* cited by examiner

WEAR RESISTANT LINING ELEMENT AND METHOD FOR DISENGAGING MATERIAL

CROSS-REFERENCE TO RELATED APPLICATIONS

This application claims priority to PCT/IEP2012/075792, filed Dec. 17, 2012, and published in English on Jun. 27, 2013 as publication number WO 2013/092489, which claims priority to EP application Ser. No. 11195642.1, filed Dec. 23, 2011, incorporated herein by reference.

TECHNICAL FIELD

The invention relates to a wear-resistant lining element which is intended for a surface on a truck haul body subjected to wear. The invention also relates to a wear-resistant lining, a truck haul body and a method for disengaging material adherent on a truck haul body surface having a wear-resistant lining.

BACKGROUND ART

Wear-resistant linings are known and used both in chutes and on truck platforms for protecting the base. They usually consist of natural or synthetic rubber and are to protect from hard impacts by rocks and wear exerted by material moving over and in contact with the surface of the wear-resistant lining element. Relatively soft rubber materials provide good resistance to wear, but to prevent hard impacts from breaking through the wear-resistant lining element, this must be given a great thickness. Harder rubber materials provide better protection from impacts, but are more susceptible to abrasive wear. Therefore, wear-resistant lining elements have been developed, in which different materials are combined in the outwardly directed surface of the element, over which surface material in the form of pieces or particles, such as crushed ore and crushed rock material, is intended to move.

A problem when using such wear-resistant lining elements in order to protect a surface from wear, such as a surface on a truck haul body, is that the material to be transported has a tendency to adhere to the surface of the wear-resistant elements, especially during a low temperature climate. In turn, this causes problems when the material is to be unloaded and thus disengaged from the transporting means, such as the truck haul body.

This problem is well known in the field of transporting materials, such as crushed ore and crushed rock material. In WO 2011/091287, for example, an inflatable liner with vibratory function related to lining mining hoppers and other such devices is disclosed. The inflatable liner has an exterior expandable layer and ceramic wear layer beneath that assists maintaining a long-use-life of the inflatable liner. A air-control device is used to rapidly inflate and deflate exterior expandable layer vibrates in the exterior expandable layer and assist removing unwanted material/debris from the exterior lining of exterior expandable layer to further maintain a long-life use of the inflatable liner and lower maintenance of the machinery/hopper.

There are, however, problems associated with such a system. The use of the air-control device complicates the system and requires that it is connected to some kind of pneumatics. Additionally, the system is complex and expensive.

SUMMARY OF THE INVENTION

It is an object of the present invention to provide an improvement of the above technique and prior art. More particularly, it is an object of the present invention to provide an improved wear-resistant lining element facilitating the disengaging of material loaded on a truck haul body. Further, it is an object of the present invention to provide a wear-resistant lining, a truck haul body and a method for disengaging material adherent on to a truck haul body surface having such a wear-resistant lining.

These and other objects as well as advantages that will be apparent from the following description of the present invention are achieved by a wear-resistant lining element which is intended for a surface on a truck haul body subjected to wear according to the independent claim.

A wear-resistant lining element which is intended for a surface on a truck haul body subjected to wear is provided. The wear-resistant lining element has an outwardly directed surface, over which material in the form of pieces or particles, such as crushed ore and crushed rock material, is intended to move, and has an inwardly directed surface intended to face the truck haul body surface. The wear-resistant lining element comprises elastomeric material. The wear-resistant lining element is characterized in that the wear-resistant lining element comprises at least one open cavity in said inwardly directed surface. When material is loaded on the truck haul body and thus on the outwardly directed surface of the wear-resistant lining element, the inwardly directed surface of the wear-resistant lining element facing the truck haul body surface will be pressed down by the weight of the material. When the material is to be unloaded from the truck haul body, said truck haul body is tilted such that loose material loaded on the truck haul body falls off. When the loose material falls off, the open cavity in the inwardly directed surface of the wear-resistant lining element will regain its unloaded shape and a part of the wear-resistant lining element will flex away from the truck haul body surface such that the any material adherent on the wear-resistant lining element facing is disengaged. The wear-resistant lining element is cheap, easy to assembly and extremely effective.

The at least one cavity may be open towards the surface on the truck haul body, which is advantageous in that the wear-resistant lining element will be easy to manufacture and to mount onto the truck haul body.

The at least one cavity may be open towards longitudinal sides of the wear-resistant lining element, which is advantageous in that such a design will provide greater flexibility properties for the wear-resistant lining element.

The at least one cavity may be open to towards transversal sides of the wear-resistant lining element, which is advantageous in that such a design will provide even greater flexibility properties for the wear-resistant lining element.

The at least one cavity may extend substantially an entire thickness of the wear-resistant lining element, which is advantageous in that such a design will provide even greater flexibility properties for the wear-resistant lining element.

The at least one cavity may extend along substantially an entire length of the wear-resistant lining element, which is advantageous in that such a design will provide even greater flexibility properties for the wear-resistant lining element.

The at least one cavity may extend along substantially an entire width of the wear-resistant lining element, which is advantageous in that such a design will provide even greater flexibility properties for the wear-resistant lining element.

The wear-resistant lining element may be made from a water repellent rubber, which is advantageous in that the risk of water freezing and thus adhering loose material to the wear-resistant lining element is reduced.

The wear-resistant lining element may comprise a plurality of neighbouring wear-resistant members mainly adapted to resist wear, which is advantageous in that the risk of damage to the wear-resistant element in force absorption is minimized.

The wear-resistant lining element may comprise at least two portions being angled in relation to each other, which advantageous in that it will facilitate the mounting of the wear-resistant lining element to the truck haul body on the edges of the same.

The wear-resistant lining element comprises a polymeric material with anti-icing properties, such as a polymeric carbon material lacking polar groups but is polymerized and vulcanized with the aid of a vulcanizing agent comprising peroxides, sulphur, sulphur derivate or metal oxides ice-preventive rubber, such that the polymeric carbon material is arranged to prevent ice from forming on the wear-resistant lining element. When the truck is used in cold weather conditions, this prevents material loaded on the truck from sticking to the truck haul body through ice which is formed in between the material.

According to a second aspect of the invention, the invention relates to a wear-resistant lining comprising at least one wear-resistant lining element according to the above described features.

According to a third aspect of the invention, the invention relates to a truck haul body of metal material lined with at least one wear-resistant lining according to the above described features. The at least one wear-resistant lining element is preferably attached to a front edge of the truck haul body.

According to a fourth aspect of the invention, the invention relates to a method for disengaging material adherent on a truck haul body surface having a wear-resistant lining. The method comprises tilting the truck haul body such that loose material loaded on the truck haul body falls off, whereby an open cavity in an inwardly directed surface of the wear-resistant lining facing the truck haul body surface expands and the wear-resistant lining flexes away from the truck haul body surface, thereby disengaging the adherent material.

Generally, all terms used in the claims are to be interpreted according to their ordinary meaning in the technical field, unless explicitly defined otherwise herein. All references to "a/an/the [element, device, component, means, etc]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF PREFERRED EMBODIMENTS OF THE INVENTION

Figure 1:
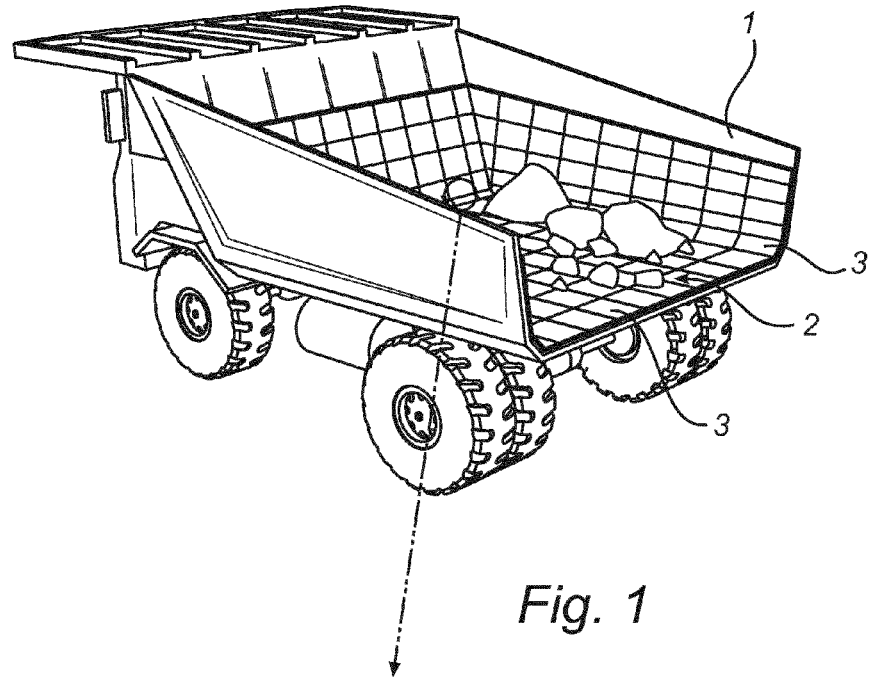
FIG. 1 is a perspective view of a truck haul body having a wear-resistant lining comprising a plurality of wear-resistant lining elements.

FIG. 1 illustrates a truck haul body 1 of metal material comprising a wear-resistant lining 2. The wear-resistant lining 2 is constituted by a plurality of wear-resistant lining elements 3. The wear-resistant elements 3 are provided along the base surface 4 of the truck haul body 1.

Figure 2:
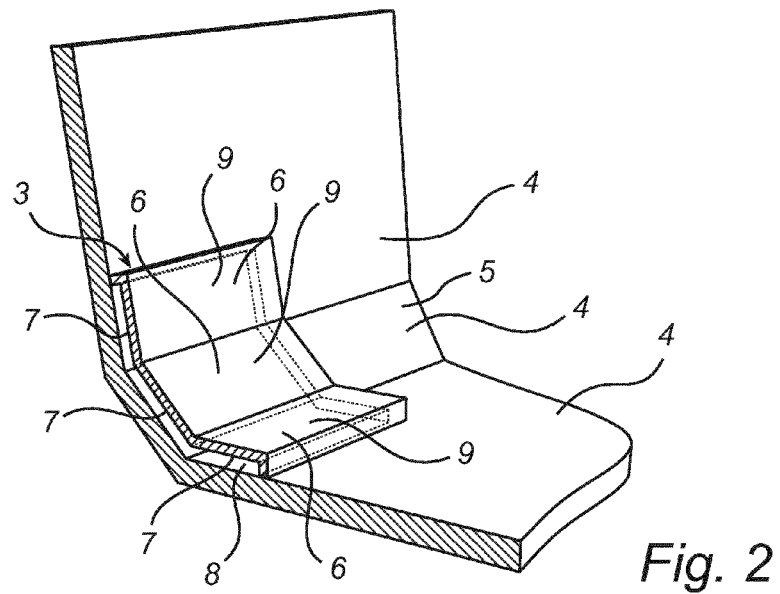
FIG. 2 is a perspective view of a wear-resistant lining element according to a first exemplary embodiment of the invention.

In FIG. 2, a wear-resistant lining element 3 according to one exemplary embodiment of the invention is illustrated. The wear-resistant lining element 3 is intended for the surface 4 of the truck haul body 1 which is subjected to wear. The wear-resistant lining element 3 has an outwardly directed surface 6, over which material in the form of pieces or particles, such as crushed ore and crushed rock material, moves, and an inwardly directed surface 7 facing the truck haul body surface 4. The wear-resistant lining element 3 comprises elastomeric material and is preferably made from a water repellent rubber material. The wear-resistant lining element 3 has an open cavity 8 in the inwardly directed surface 7. The cavity 8 is open towards the surface 4 of the truck haul body 1. The exemplary embodiment of the wear-resistant lining element 3 illustrated in FIG. 2 is applied at the edges 5 of the truck haul body 1. Therefore, the wear-resistant lining element 3 comprises three portions 9 being angled in relation to each other. The portions 9 are angled in relation to each other in order to better fit against the edges 5 of the truck haul body 1. Additionally, by means of such a structure, the wear-resistant lining element 3 will be able to flex away from the truck haul body 1 to a greater extent and thus increase the disengaging force exerted on the material adherent against the wear-resistant lining element 3. The wear-resistant lining elements 3 covering only the base surface 4 of the truck haul body 1 are flat and comprise no angled portions. The wear-resistant lining element 3 comprises a polymeric material with anti-icing properties, such as a polymeric carbon material lacking polar groups but is polymerized and vulcanized with the aid of a vulcanizing agent comprising peroxides, sulphur, sulphur derivate or metal oxides ice-preventive rubber, such that the polymeric carbon material is arranged to prevent ice from forming on the wear-resistant lining element 3.

When transporting sticky or wet material on the truck haul body 1, this material may stick to the truck haul body 1 when unloading the truck. The problem of leaving unwanted remnants of material on the truck bed is commonly known as "carry back". This is a problem, e.g., since the truck then carries around unwanted weight, leading to a higher fuel consumption and in turn higher costs than necessary. It may also be a problem that after unloading the wet or sticky material, the truck might be needed for transporting another type of material, which then could be contaminated by the "carry back". The truck driver may then have to perform cleaning of the truck haul body 1, again adding to the costs. The problems may be further accentuated in cold weather, when moisture in the transported material freezes and forms an ice layer or patches of ices mixed with material clinging to the truck haul body 1. The problem of ice making the transported material stick to the truck bed can also occur when the truck during winter is used for transporting snow or a snow and ice mixture, which also may include sand or larger pieces of solid material, such as when transporting snow from streets in the main area of a city to a snow dump site in the outskirts of the city. In order to avoid the above mentioned problems, the truck haul body 1 is equipped with the inventive wear-resistant lining elements 3 of the present application.

Figure 3A:
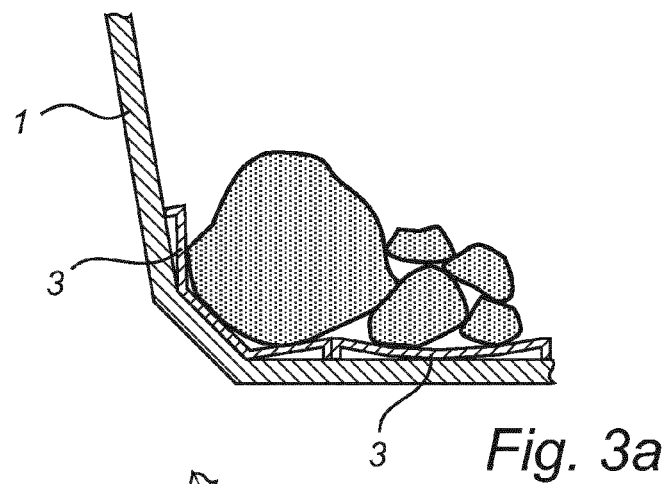
FIG. 3a is a perspective view of wear-resistant lining elements when carrying a load and the cavities are compressed.
Figure 3B:
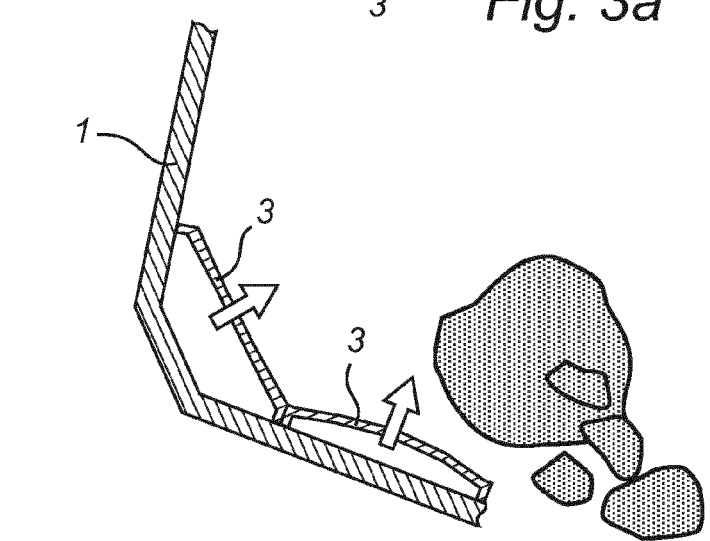
FIG. 3b is a perspective view of wear-resistant lining elements when disengaging its load and the cavities are expanded.
Figure 3C:
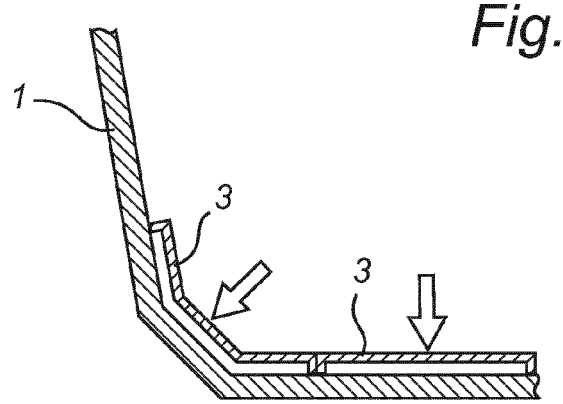
FIG. 3c is a perspective view of wear-resistant lining elements when not carrying any load and the cavities are back in their initial state.

When material is loaded on the truck haul body 1 and thus on the outwardly directed surface 6 of the wear-resistant lining element 3, the inwardly directed surface 7 of the wear-resistant lining element 3 facing the truck haul body surface 4 will be pressed down by the weight of the material, which is illustrated by FIG. 3*a*. When the material is to be unloaded from the truck haul body 1, said truck haul body 1 is tilted such that loose material loaded on the truck haul body 1 falls off. When the loose material has fallen off, the open cavity 8 in the inwardly directed surface 7 of the wear-resistant lining element 3 expands and the wear-resistant lining element 3 flexes away from the truck haul body surface 4 such that the material adherent on the wear-resistant lining element 3 is disengaged, as shown by FIG. 3*b*. In FIG. 3*c*, the wear-resistant lining element 3 is illustrated when the truck haul body 1 is unloaded and thus the wear-resistant lining element 3 is back in its initial state.

Figure 4:
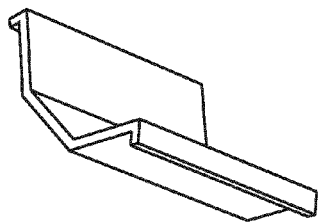
FIG. 4 is a perspective view of the wear-resistant lining element according to a second exemplary embodiment of the invention.

In FIG. 4, a second exemplary embodiment of the wear-resistant lining element 3 is illustrated. In this embodiment, the cavity 8 is open towards longitudinal sides 10 of the wear-resistant lining element 3.

Figure 5:
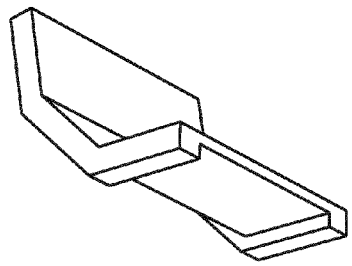
FIG. 5 is a perspective view of the wear-resistant lining element according to a third exemplary embodiment of the invention.

FIG. 5 illustrates a third exemplary embodiment of the wear-resistant lining element 3. In this embodiment, the cavity 8 is open to towards transversal sides 11 of the wear-resistant lining element 3.

Figure 6:
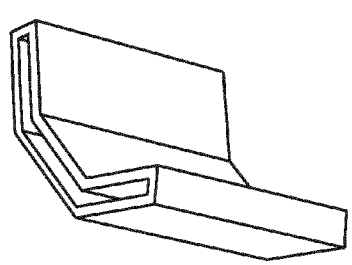
FIG. 6 is a perspective view of the wear-resistant lining element according to a fourth exemplary embodiment of the invention.

In FIG. 6, a second exemplary embodiment of the wear-resistant lining element 3 is illustrated. In this embodiment, the cavity 8 is open towards the longitudinal sides 10 of the wear-resistant lining element 3. The cavity 8 is also completely enclosed by the wear-resistant lining element 3 in a circumferential direction of the cavity 8.

Figure 7:
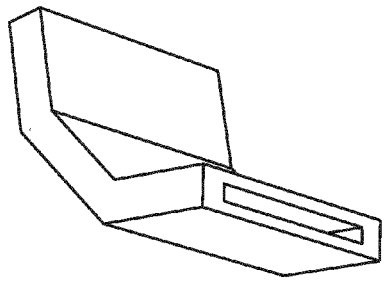
FIG. 7 is a perspective view of the wear-resistant lining element according to a fifth exemplary embodiment of the invention.

FIG. 7 illustrates a third exemplary embodiment of the wear-resistant lining element 3. In this embodiment, the cavity 8 is open to towards the transversal sides 11 of the wear-resistant lining element 3. The cavity 8 is also completely enclosed by the wear-resistant lining element 3 in a circumferential direction of the cavity 8.

The shape of the wear-resistant lining element 3 may naturally be varied further. Possible additional shapes of the wear-resistant lining element 3 are for example flat, curved, beveled, frustoconical or a U-profile.

Naturally, each wear-resistant lining element 3 may comprise one or several open cavities 8.

The wear-resistant lining element 3 may, for example, be attached to the truck haul body 1 by means of gluing, screwing, bolting. Additionally, the wear-resistant lining element 3 may be attached to the truck haul body 1 by means of a fastening means.

The wear-resistant lining element 3 may comprise a polyurethane material.

The invention has mainly been described above with reference to a few embodiments. However, as is readily appreciated by a person skilled in the art, other embodiments than the ones disclosed above are equally possible within the scope of the invention, as defined by the appended claims.

The invention claimed is:

1. A wear-resistant lining element which is intended for a surface on a truck haul body subjected to wear, said wear-resistant lining element having an outwardly directed surface, over which material in the form of pieces or particles, such as crushed ore and crushed rock material, is intended to move, and having an inwardly directed surface intended to face said truck haul body surface, said wear-resistant lining element comprising elastomeric material and at least one open cavity in said inwardly directed surface, characterized in that said wear-resistant lining element is open towards longitudinal sides of the wear-resistant lining element, and that said at least one cavity extends substantially an entire thickness and an entire length of the wear-resistant lining element.

2. A wear-resistant lining element according to claim 1, wherein said at least one cavity is open towards the surface on the truck haul body.

3. A wear-resistant lining element according to claim 1, wherein said at least one cavity extends along substantially an entire width of the wear-resistant lining element.

4. A wear-resistant lining element (3) according claim 1, wherein said wear-resistant lining element (3) is made from a water repellent rubber.

5. A wear-resistant lining element according to claim 1, wherein said wear-resistant lining element comprises at least two portions being angled in relation to each other.

6. A wear-resistant lining element according to claim 1, wherein said wear-resistant lining element comprises a polymeric material with anti-icing properties.

7. A wear-resistant lining element according to claim 1, wherein said wear-resistant lining element comprises a polymeric carbon material lacking polar groups but is polymerized and vulcanized with the aid of a vulcanizing agent comprising peroxides, sulphur, sulphur derivate or metal oxides ice-preventive rubber, such that the polymeric carbon material is arranged to prevent ice from forming on the wear-resistant lining element.

8. A wear-resistant lining comprising a plurality of wear-resistant lining elements as claimed in claim 1.

9. A truck haul body of metal material lined with at least one wear-resistant lining as claimed in claim 8.

10. A truck haul body according to claim 9, wherein said at least one wear-resistant lining element is attached to a front edge of said truck haul body.

* * * * *